United States Patent
Benchaib et al.

(10) Patent No.: US 7,109,674 B2
(45) Date of Patent: Sep. 19, 2006

(54) METHOD AND SYSTEM FOR REGULATING THE AVERAGE ELECTROMAGNETIC TORQUE OF A ROTATING ELECTRICAL MACHINE, STORAGE MEDIUM AND DATA STRUCTURE FOR CARRYING OUT THE METHOD

(75) Inventors: Abdelkrim Benchaib, Montigny le Bretonneux (FR); Jean-Luc Thomas, Fontainebleau (FR); Serge Poullain, Arpajon (FR); Jean-Claude Alacoque, Communay (FR); Eric Bonin, Jardin (FR)

(73) Assignee: ALSTOM, Paris (FR)

( * ) Notice: Subject to any disclaimer, the term of this patent is extended or adjusted under 35 U.S.C. 154(b) by 204 days.

(21) Appl. No.: 10/857,589

(22) Filed: Jun. 1, 2004

(65) Prior Publication Data

US 2005/0001572 A1  Jan. 6, 2005

(30) Foreign Application Priority Data

Jun. 2, 2003  (FR) .................................. 03 06633

(51) Int. Cl.
*H02P 7/00* (2006.01)
(52) U.S. Cl. ...................... 318/432; 318/430; 318/434; 318/443
(58) Field of Classification Search ........ 318/430–439, 318/443, 719, 722
See application file for complete search history.

(56) References Cited

U.S. PATENT DOCUMENTS

| 4,023,083 | A | * | 5/1977 | Plunkett ...................... 318/802 |
| 4,047,083 | A | * | 9/1977 | Plunkett ...................... 318/807 |
| 4,081,037 | A | * | 3/1978 | Jonsson ......................... 173/1 |
| 5,619,114 | A |   | 4/1997 | Blasko |
| 6,229,719 | B1 | * | 5/2001 | Sakai et al. .................... 363/37 |
| 6,654,548 | B1 | * | 11/2003 | Schmitz ...................... 388/825 |
| 6,674,262 | B1 | * | 1/2004 | Kitajima et al. ............ 318/722 |
| 2002/0097015 | A1 | * | 7/2002 | Kitajima et al. ............ 318/432 |
| 2004/0056629 | A1 | * | 3/2004 | Maeda et al. ............... 318/719 |
| 2004/0169482 | A1 | * | 9/2004 | Maeda ........................ 318/443 |

FOREIGN PATENT DOCUMENTS

| EP | 1 211 798 A2 | 6/2002 |
| EP | 1 292 011 A2 | 3/2003 |

* cited by examiner

*Primary Examiner*—Paul Ip
(74) *Attorney, Agent, or Firm*—Sughrue Mion, PLLC

(57) ABSTRACT

A method is described for regulating the average electromagnetic torque of a polyphase rotating electrical machine, supplied with a polyphase voltage and a polyphase current that are generated by an inverter. The method comprises a step of controlling the machine, using an exact response control process to do this, a step of determining the value of the harmonics of the voltage and/or the current which are generated by the inverter, and a step of calculating the instantaneous torque set point as a function of the value of the harmonics and an average torque set point, so as to produce an instantaneous torque set point suitable for limiting the difference between the average of the instantaneous electromagnetic torque, between two successive regulation times, and said average torque set point.

14 Claims, 3 Drawing Sheets

METHOD AND SYSTEM FOR REGULATING THE AVERAGE ELECTROMAGNETIC TORQUE OF A ROTATING ELECTRICAL MACHINE, STORAGE MEDIUM AND DATA STRUCTURE FOR CARRYING OUT THE METHOD

BACKGROUND OF THE INVENTION

1. Field of the Invention

The invention relates to a method and a system for regulating the average electromagnetic torque of a polyphase rotating electrical machine equipped with stator and/or rotor windings. The invention also relates to storage media and a data structure for carrying out this method.

2. Description of the Prior Art

To be more precise, the invention relates to a method for regulating a machine in which the stator and/or rotor windings are supplied with a polyphase voltage and a polyphase current that are generated by an inverter, the inverter being formed by switches whose switching is controllable, this method including:

a control step of switching the switches as a function of an instantaneous torque set point, using an exact response control process to do this so that the instantaneous torque set point is reached as soon as the next regulation time, and a step at each regulation time of calculating, from an average torque set point, the instantaneous torque set point to be applied so that the average of the instantaneous electromagnetic torque of the machine converges toward said average torque set point.

In the remainder of the description, the term "motor" will be used to denote a polyphase rotating electrical machine, and the term "torque" will be used to denote the electromagnetic torque of this kind of machine.

The above methods have a very wide regulation dynamic range since the instantaneous torque set point can be modified at each regulation time, and it is reached as soon as the next regulation time.

Such control methods are thus particularly useful for applications in which the torque set point changes abruptly. For example, these methods are used to control drive motors of a rolling mill.

However, when the instantaneous torque set point is obtained by simple equalization, for example by assimilating the average torque set point with the instantaneous torque set point, there is a difference between the value of the average torque set point and the average of the instantaneous torque between two successive regulation times. The average torque set point is therefore either never reached perfectly, or it is reached by forming the average of the instantaneous torque over a large number of regulation times, so that the method no longer has a wide regulation dynamic range.

It is therefore an object of the invention to overcome this drawback by providing a method for regulating the average electromagnetic torque which has a wide regulation dynamic range.

The invention therefore relates to a method for regulating the average electromagnetic torque as described above, which method includes a step of determining the value of the harmonics of the voltage and/or the current which are generated by the inverter, and the instantaneous torque set point is also established during the calculation step as a function of this value of the harmonics, so as to produce an instantaneous torque set point suitable for limiting the difference between the average of the instantaneous electromagnetic torque, between two successive regulation times, and said average torque set point.

It has been found that the difference between the average torque set point and the average of the instantaneous torque between two successive regulation times is due to the fact that the inverter cannot generate perfectly sinusoidal voltages or currents from a direct current voltage. In reality, the voltage and the current that are generated are resolved into a sinusoidal component at a fundamental frequency and into sinusoidal components with higher frequencies, corresponding to the harmonics with an order greater than or equal to two. The fundamental frequency sinusoidal component is simply referred to here as the fundamental, whereas the higher frequency sinusoidal components are referred to as harmonics.

The fundamental creates a constant torque $\Gamma_m$ over a fundamental period. The harmonics generate an oscillating secondary torque with a higher frequency. The instantaneous torque $\Gamma_s$ of the motor is the result of superposition of the torque $\Gamma_m$ and the oscillating torque. The oscillating torque and the torque $\Gamma_m$ are mutually independent. The known methods, which calculate an instantaneous torque set point only as a function of the average torque set point, do not therefore take the oscillating torque into account. Even if, for example, the instantaneous torque at each regulation time is strictly identical to the average torque set point, the average of the instantaneous torque $\Gamma_s$ between two successive regulation times will therefore not be equal to this average torque set point, since the instantaneous torque varies between these two times owing to the oscillating torque. The oscillating torque is therefore responsible for the difference between the average torque set point and the average of the instantaneous torque. This difference increases commensurately when the amplitude of the oscillating torque is large. Since the oscillating torque is created by voltage and/or current harmonics, the value of this difference is therefore a function of the value of the harmonics.

The above method corrects the deficiency of the known methods by taking into account not only the average torque set point, but also the value of the current and/or voltage harmonics, for calculating the instantaneous torque set point.

SUMMARY OF THE INVENTION

According to other characteristics of the method according to the invention, it is distinguished as follows:

the exact response control process establishes a set point for controlling the switches by pulse width modulation, and the control step also includes a control operation of switching the switches between each regulation time, employing a pulse width modulation process configured as a function of said control set point established by the exact response control process;

the pulse width modulation process is a pulse width modulation process synchronous with the frequency of the fundamental of the voltage generated by the inverter, and the regulation times are spaced apart by a time interval equal to T'/2p, where p is the number of phases of the machine and T' is the period of the fundamental of the voltage generated by the inverter;

the exact response control process is adapted so that the phase of the fundamental of the voltage generated by the inverter at the regulation times is equal to $$\frac{k\pi}{p},$$

k being an integer;

the value of the harmonics is established, during the determination step, from the value of the control set point established by the exact response control process at the preceding regulation time;

the pulse width modulation process successively uses a plurality of different pulse width modulations over time; the value of the harmonics is established from at least one calculation parameter, the various values of the or each parameter being calculated in advance and prerecorded for each different pulse width modulation liable to be used; and the value of the or each parameter to be used during the determination step is selected as a function of the value of the control set point established by the exact response control process at the preceding regulation time;

a calculation parameter is defined by the following relationship:

$$\varepsilon(0) = \left(\sum_{n=2}^{\infty} \frac{V_n}{n}\right)_0$$

where:

$V_n$ is the amplitude of the voltage harmonic of order n,
n is an integer corresponding to the order of the harmonic;

the control set point is a voltage vector defined, in an orthonormal reference frame α,β which is fixed with respect to the stator windings, by its modulus and an angle, and in that the value of the current harmonics is established from the following relationship:

$$\Delta I_q = -\frac{\varepsilon(0)}{L \cdot \omega} \cdot \cos(\beta_0 - \rho_0)$$

where:

L is the stator inductance of the rotating electrical machine,

ω is the angular velocity of the rotor of the rotating electrical machine, $\beta_0$ is the angle of the voltage vector established (at 96) at the preceding regulation time by the exact response control process, $\Delta I_q$ is the value of the current harmonics along the axis q in a rotating reference frame d,q associated with the rotor flux, the rotor flux being aligned with the axis d, and $\rho_0$ is the angle of the reference frame d,q with respect to the fixed reference frame α,β associated with the stator windings.

a calculation parameter is defined by the following relationship:

$$\delta(0) = \left(\sum_{n=2}^{\infty} V_n\right)$$

where $V_n$ is the amplitude of the voltage harmonic of order n;

the inverter is supplied from at least one amplitude-limited direct current supply voltage, and the instantaneous torque set point is also established during the calculation step as a function of the instantaneous value of the direct current voltage available at the regulation time, so that the instantaneous torque set point corresponds to an available direct current voltage.

the instantaneous torque set point is established in the form of an instantaneous current set point with the aid of the following relationships:

$$[\hat{I}_d - \hat{I}_{dc}]^2 + [\hat{I}_q - \hat{I}_{qc}]^2 \leq \frac{\hat{V}_M^2}{Z^2}$$

$$\hat{I}_d^2 + \hat{I}_q^2 \leq \hat{I}_M^2$$

where:

$\hat{V}_M$ is the instantaneous value of the maximum direct current voltage available for supplying the inverter, $\hat{I}_M$ is the instantaneous value of the maximum current that can be generated by the inverter 8, $\hat{I}_q$ and $\hat{I}_d$ are the components of the set point of the instantaneous current vector respectively along the axes q and d of the reference frame d,q Z is defined by the following relationship:

$Z = \sqrt{R^2 + L^2 \cdot \omega^2}$, where R is the stator resistance of the machine, L is the stator inductance of the machine and ω is the angular velocity of the rotor of the machine, $\hat{I}_{dc}$ and $\hat{I}_{qc}$ are defined by the following relationships:

$$\hat{I}_{dc} = -\frac{L \cdot \omega}{Z^2} \cdot \{R \cdot (\Delta I_q - \Delta J_q) - L \cdot \omega \cdot (\Delta I_d - \Delta J_d) + \omega \cdot \Phi_a\}$$

$$\hat{I}_{qc} = -\frac{1}{Z^2} \cdot \{R \cdot \omega \cdot \phi_a - R \cdot L \cdot \omega \cdot (\Delta I_d - \Delta J_d) - L^2 \cdot \omega^2 \cdot (\Delta I_q - \Delta J_q)\}$$

where:

$\Delta I_d$ and $\Delta I_q$ are the components of the harmonic current vector generated by the inverter, respectively along the axes d and q of the reference frame d,q, and $\Delta J_q$ and $\Delta J_d$ are components proportional to the harmonic voltage vector generated by the inverter, respectively along the axes q and d of the reference frame d,q, the components $\Delta I_d$, $\Delta J_q$ and $\Delta J_d$ being defined by the following relationships:

$$\Delta I_d = +\frac{\varepsilon(0)}{L \cdot \omega} \cdot \sin(\beta_0 - \rho_0)$$

$$\Delta J_d = \frac{\delta(0)}{L \cdot \omega} \cdot \sin(\beta_0 - \rho_0)$$

$$\Delta J_q = -\frac{\delta(0)}{L \cdot \omega} \cdot \cos(\beta_0 - \rho_0)$$

The invention also relates to an information storage medium, which includes instructions for carrying out a regulation method according to the invention, when these instructions are carried out by an electronic computer.

The invention also relates to a data structure which associates a plurality of angles and the value of at least one regulation parameter with each particular value of a control set point established by the exact response control process, the set of angles associated with a given value of said control set point defining a particular pulse width modulation synchronous with the frequency of the fundamental of the voltage generated by the inverter, and the value of said at least one regulation parameter being a function of the value of the current and/or voltage harmonics which are generated by the inverter, when it is controlled with the aid of the pulse width modulation defined by the angles associated with the same value of the control set point.

The invention also relates to a system for regulating the average electromagnetic torque of a polyphase rotating electrical machine equipped with stator and/or rotor windings, which are supplied with a polyphase voltage and a polyphase current that are generated by an inverter, the inverter being formed by switches whose switching is controllable, this system including:

a control unit for the switching of the switches as a function of an instantaneous torque set point, this control unit being capable of using an exact response control process to do this so that the instantaneous torque set point is reached as soon as the next regulation time;

a unit for calculating, from an average torque set point, the instantaneous torque set point to be applied so that the average of the instantaneous electromagnetic torque of the machine converges toward said average torque set point;

which system includes a unit for determining the value of the harmonics of the voltage and/or the current which are generated by the inverter, and wherein the calculation unit also calculates the instantaneous torque set point as a function of this value of the harmonics, so as to produce an instantaneous torque set point suitable for limiting the difference between the average of the instantaneous electromagnetic torque, between two successive regulation times, and said average torque set point.

The invention will be understood more clearly by reading the following description, which is provided solely by way of example only and given with reference to the drawings.

DETAILED DESCRIPTION OF THE PREFERRED EMBODIMENT

Figure 1:
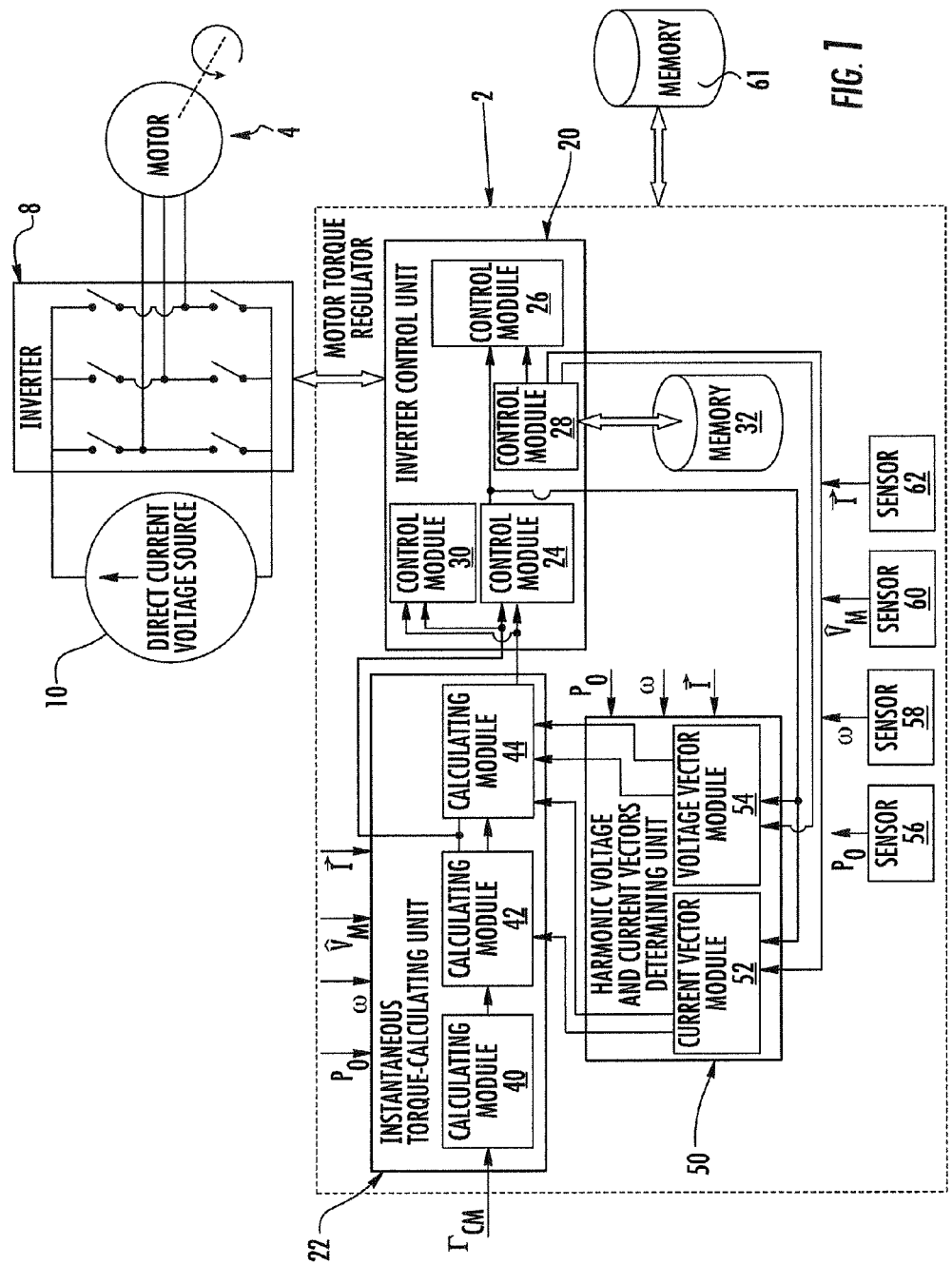
FIG. 1 is a schematic illustration of a regulation system according to the invention.

FIG. 1 represents a system 2 for regulating the average electromagnetic torque of a motor 4 equipped with a stator and a rotor.

The remainder of the description will refer to the particular case in which this motor 4 is a smooth pole three-phase synchronous motor with permanent magnets mounted at the surface of the rotor. The stator is equipped with stator windings.

In particular, the mathematical relationships given in the remainder of this description are those established from the equations of state of this kind of motor.

The system 2 is capable of receiving an average torque set point $\Gamma_{cm}$ at its input and of delivering control signals for a conventional three-phase inverter 8 at its output. This inverter 8 is supplied by a direct current voltage source 10.

This inverter 8 conventionally comprises three branches known as "legs", each formed by two switches connected in series by means of a center point. The center point of each leg is connected to the stator windings of the motor 4 so as to supply each phase of this motor with voltage and current.

The system 2 includes a unit 20 for controlling the inverter 8 as a function of an instantaneous torque set point, and a unit 22 for calculating this instantaneous torque set point as a function of the set point $\Gamma_{cm}$.

The control unit 20 includes an exact response control module 24, and a module 26 for controlling the switching of the switches of the inverter 8 by pulse width modulation.

The module 24 receives an instantaneous torque set point in the form an instantaneous current vector $(\hat{I}_d, \hat{I}_q)$ at its input, and delivers a voltage vector $\vec{V}$ at its output.

The instantaneous current vector $(\hat{I}_d, \hat{I}_q)$ is defined in a rotating orthonormal reference frame d,q associated with the flux of the rotor of the motor 4, whose axis d is aligned with the rotor flux of the motor and whose axis q is derived from the axis d by a rotation through $$\frac{\pi}{2}$$

in the right-handed trigonometric sense. The voltage vector $\vec{V}$ is defined, in a fixed orthonormal reference frame α,β associated with the stator of the motor 4, by its modulus $\|\vec{V}\|$ and an angle $\beta_0$ with respect to the axis after a regulation interval T, starting from the original state of the stator current at the preceding measurement and regulation time for the currents.

T is the time interval between the current regulation time and the next regulation time, R is the stator resistance of the motor, L is the stator inductance of the motor, and τ is the stator time constant $$\left(\tau = \frac{L}{R}\right).$$

The module 26 can control the switching of the switches of the inverter 8 as a function of the value of the angle $\beta_0$ calculated by the module 24, and as a function of the value of angles $\alpha_i$ selected by the module 28. To this end, the module 26 uses a conventional pulse width modulation process synchronous with the frequency of the fundamental of the voltage generated by the inverter 8. An example of a control signal generated by this module 26 is represented in FIG. 2.

Figure 2:
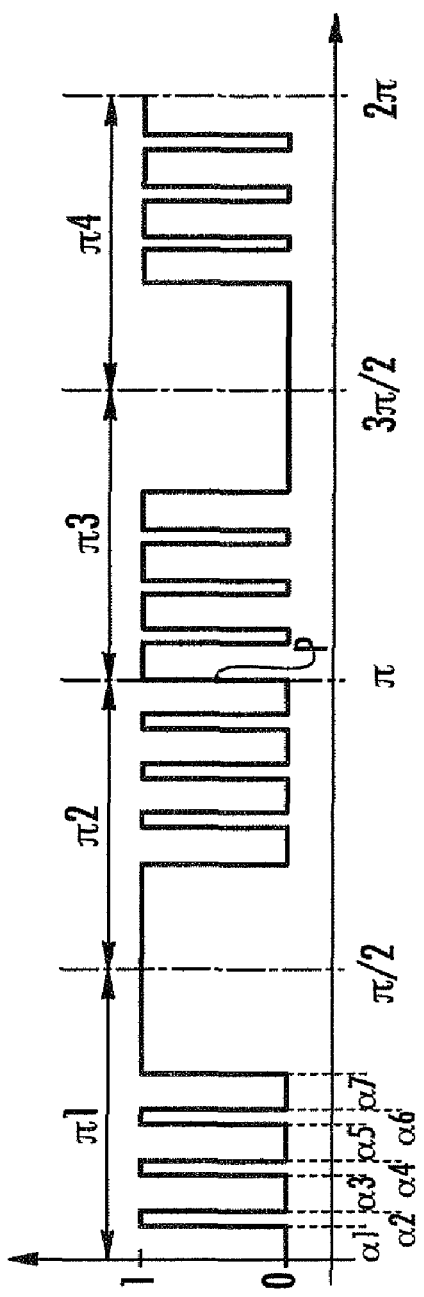
FIG. 2 is graph representing the development of a control signal generated by the system in FIG. 1 as a function of time.

FIG. 2 represents the development of the signal for controlling an upper switch of one leg of the inverter 8 as a function of time. Here, for example, the value 0 of the signal indicates that the switch is to be opened and the value 1 indicates that the switch is to be closed. FIG. 2 represents the regulation times as a function of the phase of the voltage fundamental generated by the inverter 8. The interval [0, 2Π] is divided into four equal sub-intervals $\Pi_1$, $\Pi_2$, $\Pi_3$ and $\Pi_4$. In the interval $\Pi_1$, the switching times of the switch are defined by angles $\alpha_i$. Here, seven angles $\alpha_i$ are needed to define the switching of the switch during the interval $\Pi_1$, and the pulse width modulation represented here is therefore referred to as "seven-angled". The switching times in the intervals $\Pi_2$ to $\Pi_4$ are derived by conventional transformations from those defined for the interval $\Pi_1$. The control signals of the other switches are α. The reference frames d,q and α,β are conventional in this technical field, and transformation of the coordinates expressed in one reference frame into those expressed in the other reference frame is carried out by rotating the reference axes.

To be more precise, the module 24 delivers the angle $\beta_0$ and the average of the modulus of the voltage vector $\vec{V}$, between two regulation times, at its output.

The angle $\beta_0$ is transmitted directly to an input of the control module 26, whereas the modulus $\|\vec{V}\|$ is transmitted to a module 28 for selecting the type of pulse width modulation.

The module 24 is capable of calculating the value of the voltage vector $\vec{V}$ so that the instantaneous torque set point corresponding to the set point $(\hat{I}_d, \hat{I}_q)$ is reached at the next regulation time. To this end, the module 24 uses an exact response control process, also known as "deadbeat control". For example, the process used here is described in patent application EP-A-123 35 06. It will therefore merely be mentioned as a reminder that the relationship used to calculate the value of the voltage vector $\vec{V}$ as a function of the input set point $(\hat{I}_d, \hat{I}_q)$ is as follows:

$$V_{dq} = \begin{vmatrix} V_d \\ V_q \end{vmatrix} = \frac{1}{a(T)} \cdot \begin{vmatrix} \hat{I}_d - I_d^0(T) \\ \hat{I}_q - I_q^0(T) \end{vmatrix} \quad (1)$$

in which:

$$a(T) = \frac{1}{R} \cdot \left(1 - e^{-\frac{T}{\tau}}\right)$$

and:

$$\begin{vmatrix} I_d^0(T) \\ I_q^0(T) \end{vmatrix}$$

is the natural development of the instantaneous currents of the stator of the motor in short-circuit derived from that in FIG. 2 by shifting the signal of FIG. 2 by $$\frac{2\pi}{p},$$

where p is the number of phases of the motor 4.

So as to eliminate the harmonics of even order and the harmonics whose order is a multiple of three, the control signal in this case has two axes of symmetry at the abscissas $$\frac{\pi}{2}$$

and $$\frac{3\pi}{2},$$

and a point of symmetry P at the abscissa Π.

A type of modulation is thus defined once the value of the angles $\alpha_i$ is known. The value of the angles $\alpha_i$ fixes the modulus of the fundamental of the voltage generated by the inverter.

The module 28 can select the value of the angles $\alpha_i$ which correspond to voltage moduli $\|\vec{V}\|$. To this end, the module 28 is associated with a memory 32 containing a table TP of the following form:

| $\|\vec{V}\|_1$ | $\varepsilon(0)_1$ | $\delta(0)_1$ | $\alpha_{11}$ | $\alpha_{21}$ | $\alpha_{31}$ | $\alpha_{41}$ | $\alpha_{51}$ | $\alpha_{61}$ | $\alpha_{71}$ |
|---|---|---|---|---|---|---|---|---|---|
| ⋮ | ⋮ | ⋮ | ⋮ | ⋮ | ⋮ | ⋮ | ⋮ | ⋮ | ⋮ |
| $\|\vec{V}\|_k$ | $\varepsilon(0)_k$ | $\delta(0)_k$ | $\alpha_{1k}$ | $\alpha_{2k}$ | $\alpha_{3k}$ | $\alpha_{4k}$ | $\alpha_{5k}$ | $\alpha_{6k}$ | $\alpha_{7k}$ |
| ⋮ | ⋮ | ⋮ | ⋮ | ⋮ | ⋮ | ⋮ | ⋮ | ⋮ | ⋮ |
| $\|\vec{V}\|_m$ | $\varepsilon(0)_m$ | $\delta(0)_m$ | $\alpha_{1m}$ | $\alpha_{2m}$ | $\alpha_{3m}$ | $\alpha_{4m}$ | $\alpha_{5m}$ | $\alpha_{6m}$ | $\alpha_{7m}$ |

For each normalized value $$\|\vec{V}\|_j$$

of the voltage modulus $\|\vec{V}\|$, this table provides the value of the angles $\alpha_{ik}$ allowing the inverter 8 to generate a voltage for which the modulus of the fundamental is equal to the modulus $\|\vec{V}\|$. The relationship for converting from the normalized value of the modulus $\|\vec{V}\|$ to the value produced by the module 24 is as follows:

$$\|\vec{V}\| = \|\vec{V}\| \cdot \hat{V}_M$$

where:

$\hat{V}_M$ is the instantaneous value of the voltage across the terminals of the source 10.

For each normalized value of the modulus $\|\vec{V}\|$, this table also provides the value of two parameters $\varepsilon(0)$ and $\delta(0)$. The way in which the values of these parameters are calculated, and the advantage of using them, will become apparent on reading the remainder of the description. The modulus 28 can therefore select the value of the parameters $\varepsilon(0)$ and $\delta(0)$ corresponding to the value of the modulus $\|\vec{V}\|$ and deliver them at its output.

If the normalized value $\|\vec{V}\|$ lies between two values prerecorded in the table TP, the selection module 28 is able to calculate the corresponding values of the parameters $\varepsilon(0)$ and $\delta(0)$ and of the angles $\alpha_i$ by linear interpolation.

The control unit 20 also includes a module 30 for determining the regulation times. This module 30 can determine the interval T between two successive regulation times so that it is equal to $$\frac{T'}{2p},$$

where T' is the period of the fundamental of the voltage generated by the inverter 8 and p is the number of phases of the motor 4. The reason is that this choice of the value of the interval T has been found to eliminate certain orders of voltage harmonics generated by the inverter 8. Furthermore, in order to simplify some of the relationships described below, these regulation times are determined here in order to correspond to times at which the phase of the voltage vector $\vec{V}$ is an integer multiple of $$\frac{\pi}{p}.$$

To this end, for example, the module 30 can solve the following relationship by successive iterations so as to determine the value of the time interval T:

$$\sin\left[k \cdot \frac{\pi}{3} - (\rho_0 + \omega \cdot T + \varphi_D)\right] = e^{\frac{T}{\tau}} \cdot \frac{\left\|\vec{I}_{dq}^{D}(0)\right\|}{\left\|\vec{I}_{dq}^{D}(T)\right\|} \cdot \qquad (2)$$

$$\sin\left(k \cdot \frac{\pi}{3} - (\rho_0 + \varphi_0)\right)$$

where:

the angles $\varphi_D$ and $\varphi_0$ are defined by the following relationships:

$$\cos(\varphi_D) = \frac{I_d^D(T)}{\left\|\vec{I}_{dq}^{D}(T)\right\|} \quad \cos(\varphi_0) = \frac{I_d^D(0)}{\left\|\vec{I}_{dq}^{D}(0)\right\|} \qquad (3)$$

$$\sin(\varphi_D) = \frac{I_q^D(T)}{\left\|\vec{I}_{dq}^{D}(T)\right\|} \quad \sin(\varphi_0) = \frac{I_q^D(0)}{\left\|\vec{I}_{dq}^{D}(0)\right\|}$$

$I_d^D(T)$, $I_q^D(T)$, $I_d^D(0)$ and $I_q^D(0)$ are defined by the following relationships:

$$\vec{I}_{dq}^{D}(T) = \begin{vmatrix} I_d^D(T) \\ I_q^D(T) \end{vmatrix} = \begin{vmatrix} \hat{I}_d + \frac{X^2}{L \cdot Z^2} \cdot \Phi_a \\ \hat{I}_q + \frac{R \cdot X}{L \cdot Z^2} \cdot \Phi_a \end{vmatrix} \qquad (4)$$

$$\vec{I}_{dq}^{D}(0) = \begin{vmatrix} I_d^D(0) \\ I_q^D(0) \end{vmatrix} = \begin{vmatrix} \hat{I}_d(0) + \frac{X^2}{L \cdot Z^2} \cdot \Phi_a \\ \hat{I}_q(0) + \frac{R \cdot X}{L \cdot Z^2} \cdot \Phi_a \end{vmatrix}$$

Where:

$\Phi_a$ is the rotor flux of the magnets,

L is the stator inductance of the motor,

X is defined by the relationship $X = L \cdot \omega$, where $\omega$ is the angular velocity of the rotor, Z is defined by the following relationship $$Z^2 = R^2 + L^2 \cdot \omega^2$$

$\hat{I}_d(0)$ and $\hat{I}_q(0)$ are the components in the reference frame d,q of the instantaneous current vector measured at the current regulation time, $\hat{I}_d$ and $\hat{I}_q$ is the current set point received at the input of the module 24.

Relationship (2) is obtained by solving the system of equations (1) supplemented by an extra equation in order to express the constraint according to which the phase of the voltage vector must be equal to $$\frac{k\pi}{p},$$

where k is an integer lying between [1, . . . ,6] and p is the number of phases of the motor 4. In the three-phase case, this extra equation is for example as follows:

$$V_\alpha \cdot \sin\left(k \cdot \frac{\pi}{3}\right) - V_\beta \cdot \cos\left(k \cdot \frac{\pi}{3}\right) = 0 \qquad (4)$$

where $V_\alpha$, $V_\beta$ are the components of the voltage vector in the reference frame $\alpha,\beta$.

Further details about how to determine the time interval T may be found in the French patent application entitled "Method for regulating the instantaneous electromagnetic torque of a polyphase rotating electrical machine" filed in France on the same day by the Applicant.

The calculation unit 22 converts the average torque set point $\Gamma_{cm}$ into an instantaneous torque set point expressed in the form of the instantaneous current vector set point $(\hat{I}_d, \hat{I}_q)$. To this end, it includes a module 40 for calculating a fundamental current set point $\tilde{I}_q$ a module 42 for correcting this fundamental current set point and a module 44 for establishing the set point $(\hat{I}_d, \hat{I}_q)$ while taking the operational limitations of the inverter 8 into account.

The module 40 establishes the fundamental current set point $\tilde{I}_q$ from the set point $\Gamma_{cm}$ with the aid of the following relationship:

$$\tilde{I}_q = \frac{\Gamma_{cm}}{N_p \cdot \Phi_a}$$

where:

$N_p$ is the number of pole pairs of the motor, $\Phi_a$ is the rotor flux of the magnets.

These two parameters $N_p$ and $\Phi_a$ are known parameters which depend on the characteristics of the motor 4.

The module 42 can correct the set point $\tilde{I}_q$ as a function of the value of the harmonics of the current which is generated by the inverter 8, with the aid of the following relationship:

$$\hat{I}_q = \tilde{I}_q + \Delta I_q \qquad (5)$$

where:

$\hat{I}_q$ is the component of the set point $(\hat{I}_d, \hat{I}_q)$ along the axis q of the reference frame d,q, and $\Delta I_q$ is the component of the harmonic current vector along the axis q of the reference frame d,q.

The harmonic current vector is the one corresponding only to the harmonics of the current which is generated by the inverter 8, without taking the fundamental into account.

The module 44 can establish the set point $(\hat{I}_d, \hat{I}_q)$ intended for the module 24, which complies with the voltage and current limitations of the inverter 8. To this end, the module 44 can solve the following system of in equations:

$$[\hat{I}_d - \hat{I}_{dc}]^2 + [\hat{I}_q - \hat{I}_{qc}]^2 \le \frac{\hat{V}_M^2}{Z^2} \qquad (6)$$

$$\hat{I}_d^2 + \hat{I}_q^2 \le \hat{I}_M^2 \qquad (7)$$

where:

$\hat{V}_M$ is the instantaneous value of the maximum direct current voltage available across the terminals of the source 10, $\hat{I}_M$ is the instantaneous value of the maximum current that can be generated by the inverter 8, $\hat{I}_d$ is the component of the instantaneous current vector along the axis d of the reference frame d,q Z is defined by the following relationship:

$$Z = \sqrt{R^2 + L^2 \cdot \omega^2}$$

where R is the stator resistance, L is the stator inductance and ω is the angular velocity.

$\hat{I}_{dc}$ and $\hat{I}_{qc}$ are defined by the following relationships:

$$\hat{I}_{dc} = -\frac{L \cdot \omega}{Z^2} \cdot \{R \cdot (\Delta I_q - \Delta J_q) - L \cdot \omega \cdot (\Delta I_d - \Delta J_d) + \omega \cdot \Phi_a\} \quad (8)$$

$$\hat{I}_{qc} = -\frac{1}{Z^2} \cdot \{R \cdot \omega \cdot \phi_a - R \cdot L \cdot \omega \cdot (\Delta I_q - \Delta J_q) - L^2 \cdot \omega^2 \cdot (\Delta I_d - \Delta J_d)\} \quad (9)$$

where:

$\Delta I_d$ is the component of the harmonic current vector along the axis d of the reference frame d,q, and $\Delta J_q$ and $\Delta J_d$ are components proportional to the harmonic voltage vectors, respectively along the axes d and q of the reference frame d,q.

Here, the instantaneous maximum voltage $\hat{V}_M$ and the angular velocity ω are measured. The instantaneous maximum current $\hat{I}_M$ is constant and known from the electrical characteristics of the inverter 8. The calculation of the value of the components $\Delta I_d$, $\Delta J_q$ and $\Delta J_d$ is defined below.

The system 2 also includes a unit 50 for determining the harmonic voltage and current vectors along the axes d and q of the reference frame d,q. To this end, the unit 50 includes a first module 52 for determining the harmonic current vector and a second module 54 for determining the harmonic voltage vector. To be more precise, the module 52 can deliver the value of the components $\Delta I_q$ and $\Delta I_d$ to the modules 42 and 44, and the module 54 can deliver the value of the components $\Delta J_q$ and $\Delta J_d$ to the module 44.

To this end, the module 52 establishes the value of the components $\Delta I_q$ and $\Delta I_d$ with the aid of the following relationships:

$$\Delta I_d = \frac{\varepsilon(0)}{L \cdot \omega} \cdot \sin(\beta_0 - \rho_0) \quad (10)$$

$$\Delta I_q = -\frac{\varepsilon(0)}{L \cdot \omega} \cdot \cos(\beta_0 - \rho_0) \quad (11)$$

where:

$\rho_0$ is the angle of the reference frame d,q with respect to the reference frame a,d fixed to the stator, and $\beta_0$ is the angle of the vector $\vec{V}$.

The module 54 establishes the components $\Delta J_q$ and $\Delta J_d$ with the aid of the following formulae:

$$\Delta J_d = \frac{\delta(0)}{L \cdot \omega} \cdot \sin(\beta_0 - \rho_0) \quad (12)$$

$$\Delta J_q = -\frac{\delta(0)}{L \cdot \omega} \cdot \cos(\beta_0 - \rho_0) \quad (13)$$

The modules 52 and 54 are also connected to the outputs of the module 24 and of the module 28, so as to obtain the value of the angle $\beta_0$ and the value of the parameters $\varepsilon(0)$ and $\delta(0)$.

$\Delta I_q$ and $\Delta I_d$ are associated with the values of the voltage harmonics by the following relationships $$\begin{cases} \Delta V_d = L\omega \Delta J_d \\ \Delta V_q = L\omega \Delta J_q \end{cases}$$

Where:

and $\Delta V_q$ and $\Delta V_d$ are the components of the harmonic voltage vector, respectively along the axes q and d of the reference frame d,q.

However, only the components $\Delta J_d$ and $\Delta J_q$ are used here.

Lastly, the system 2 includes a sensor 56 for the angular position $\rho_0$ of the rotor of the motor 4, a sensor 58 for the angular velocity ω of the rotor of the motor 4, a sensor 60 for the instantaneous direct current voltage $\hat{V}_M$ delivered by the source 10 to the inverter 8, and a sensor 62 for the instantaneous current in the stator windings.

The sensor 62 is formed by a plurality of elementary-current sensors, each suitable for measuring the current in the stator windings of one phase of the motor 4, so as to measure the instantaneous current vector. This sensor 62 can also convert the measured instantaneous current vector using the generalized Concordia transformation for a polyphase system, so as to deliver the two components of the instantaneous current vector $\hat{I}_d(0)$ and $\hat{I}_q(0)$ directly at its output.

These sensors are connected to the various modules which require a measurement of these values. In particular, the sensor 56 delivers the value of the angle $\rho_0$ to the modules 52 and 54. The connections between the sensors 56 to 62 and the various modules of the system 2 have not all been represented in order to simplify the illustration.

The system 2 is typically produced with the aid of conventional programmable electronic computers. To this end, the system 2 is associated with a memory 61 containing instructions for carrying out the method of FIG. 3, when these are carried out by the system 2.

The way in which the system 2 operates will now be described with reference to the method of FIG. 3.

Figure 3:
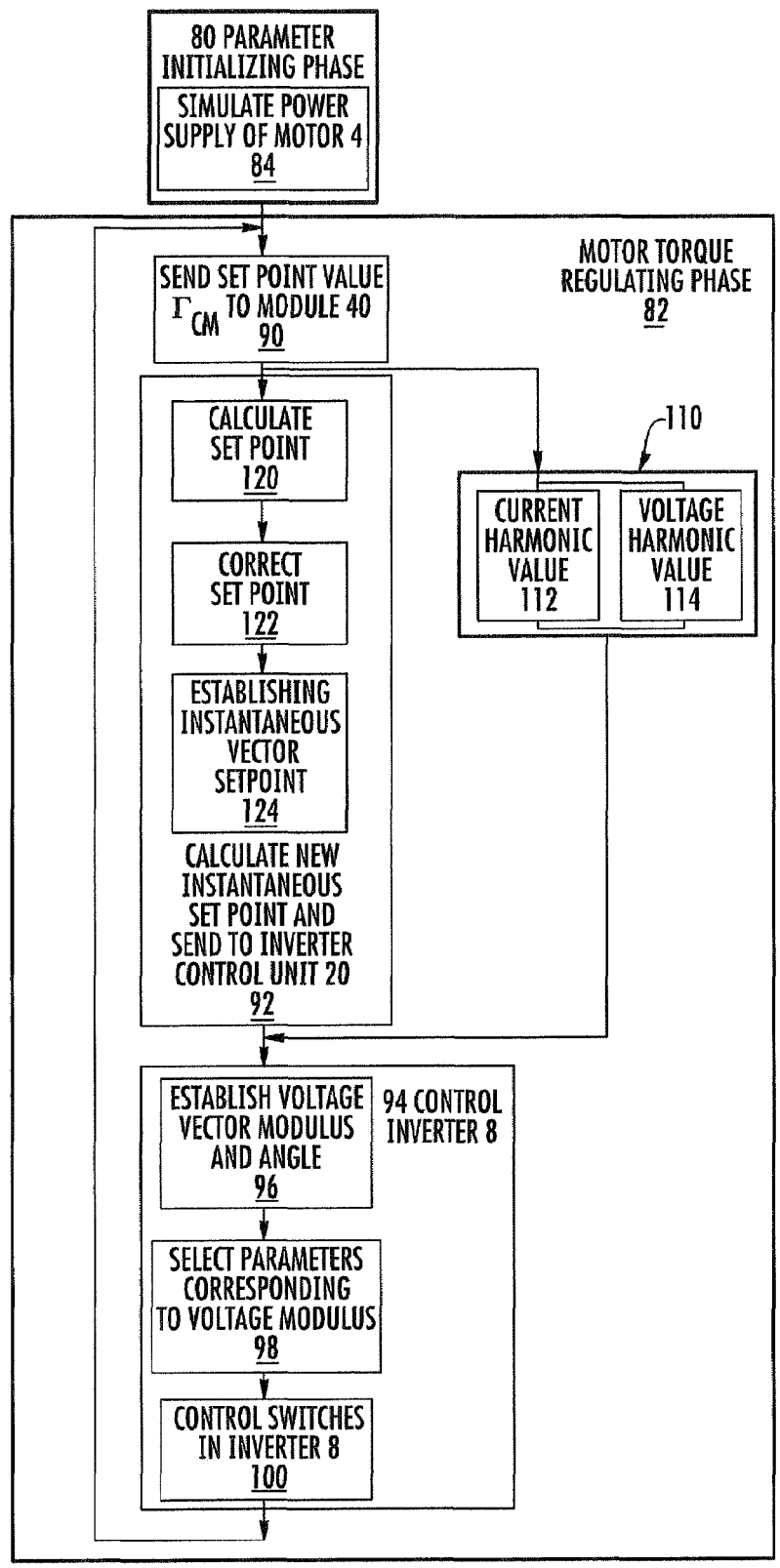
FIG. 3 is a flow chart of a regulation method according to the invention.

The method of FIG. 3 is broken down into two main phases, a phase 80 of initializing the various constant parameters used by the modules of the system 2, and a phase 82 of regulating the torque of the motor 4.

During the phase 80, the values of the parameters Np, $\Phi_a$, $\hat{I}_M$, R, L and Z are determined from the electrical and mechanical characteristics of the motor and of the inverter 8. Once determined, for example, these parameter values are stored in the memory 61.

During the phase 80, the values of the parameters $\varepsilon(0)$ and $\delta(0)$ are determined for each value of the modulus $\|\vec{V}\|$ with the aid of the following relationships:

$$\varepsilon(0) = \left(\sum_{n=2}^{\infty} \frac{V_n}{n}\right)_0 \quad (14)$$

$$\delta(0) = \left(\sum_{n=2}^{\infty} V_n\right)_0 \quad (15)$$

where:

$V_n$ is the amplitude of the harmonic of order n, and n is an integer corresponding to the order of the harmonic.

The amplitude of the harmonics varies as a function of the type of modulation, that is to say as a function of the value of the angles $\alpha_i$ and of the instantaneous value of the direct current voltage.

The relationships were established for the case in which the regulation times are selected to correspond exactly with the times at which the phase of the fundamental of the voltage generated by the inverter is equal to $$\frac{k\pi}{p},$$

k being an integer. This is because it has been observed that relationships (14) and (15) are simpler to express and therefore to calculate at these precise regulation times. In particular, the values of the parameters $\epsilon(0)$ and $\delta(0)$ are independent of when these times occur.

Here, for example, the values of these parameters $\epsilon(0)$ and $\delta(0)$ are calculated by simulating a numerical model of the motor 4 and of the inverter 8. To be more precise, an operation 84 simulates the power supply of the motor 4 with the aid of the pulse width modulation defined by the angles ail stored in the memory 32. The three-phase voltage generated by the model is then analyzed and the value of the amplitude of, for example, the first 2000 voltage harmonics with an order greater than two is measured. With the aid of these 2000 values and the above relationships (14) and (15), the values of the parameters $\epsilon(0)$ and $\delta(0)$ are calculated for the pulse width modulation defined by the angles ail. At the end of the operation 84, a normalized value of the parameters $\epsilon(0)$ and $\delta(0)$ calculated in this way is recorded in the table TP of the memory 32, on the row corresponding to the angles $\alpha_{i1}$. The normalized value of $\epsilon(0)$ and $\delta(0)$ is obtained when dividing them by the value $\hat{V}_M$.

The operation 84 is then repeated for each type of modulation defined in the table TP of the memory 32. At the end of the phase 80, the values of the parameters $\epsilon(0)$ and $\delta(0)$ defined for each type of modulation are thus recorded in the memory 32.

Once the values of all the parameters needed for running the system 2 have been recorded, the regulation phase 82 can begin.

During the regulation phase, the system 2 receives the value of the set point $\Gamma_{cm}$ during an operation 90. This set point $\Gamma_{cm}$ is, for example, delivered by an operator or by a feedback control device (not shown). The value of this set point $\Gamma_{cm}$ generally varies slowly with respect to the frequency at which a new instantaneous current set point $(\hat{I}_d, \hat{I}_q)$ is delivered to the module 24.

At each regulation time, the unit 22 calculates a new instantaneous current set point ad $(\hat{I}_d, \hat{I}_q)$ during a step 92. This new set point $(\hat{I}_d, \hat{I}_q)$ is applied to the input of the control unit 20.

From the current regulation time until the next regulation time, the unit 20 controls the inverter 8 as a function of this instantaneous current set point during a step 94. The instantaneous current set point remains constant between two regulation times.

To be more precise, during an operation 96 at the current regulation time, the module 24 establishes the values of the angle $\beta_0$ and of the modulus $\|\vec{V}\|$ which make it possible to obtain the instantaneous torque corresponding to the instantaneous current set point $(\hat{I}_d, \hat{I}_q)$ as soon as the next regulation time.

The angle $\beta_0$ of the voltage vector V established by the module 24 is transmitted directly to the module 26, whereas the modulus $\|\vec{V}\|$ of this same vector is transmitted to the selection module 28.

During an operation 98, the module 28 selects the values of the angles $\alpha_i$ and the values of the parameters $\epsilon(0)$ and $\delta(0)$ corresponding to the value of the modulus $\|\vec{V}\|$. The recorded values of the parameters $\epsilon(0)$ and $\delta(0)$ are multiplied by the value $\hat{V}_M$ measured at this time.

The selected values of the angles $\alpha_i$ are transmitted to the module 26, whereas the non-normalized values of the parameters $\epsilon(0)$ and $\delta(0)$ are transmitted respectively to the modules 52 and 54.

With the aid of the angle $\beta_0$ and of the values of the angles $\alpha_i$, during an operation 100, the module 26 controls the switching of the switches of the inverter 8 by using a synchronous pulse width modulation process.

Figure 4:
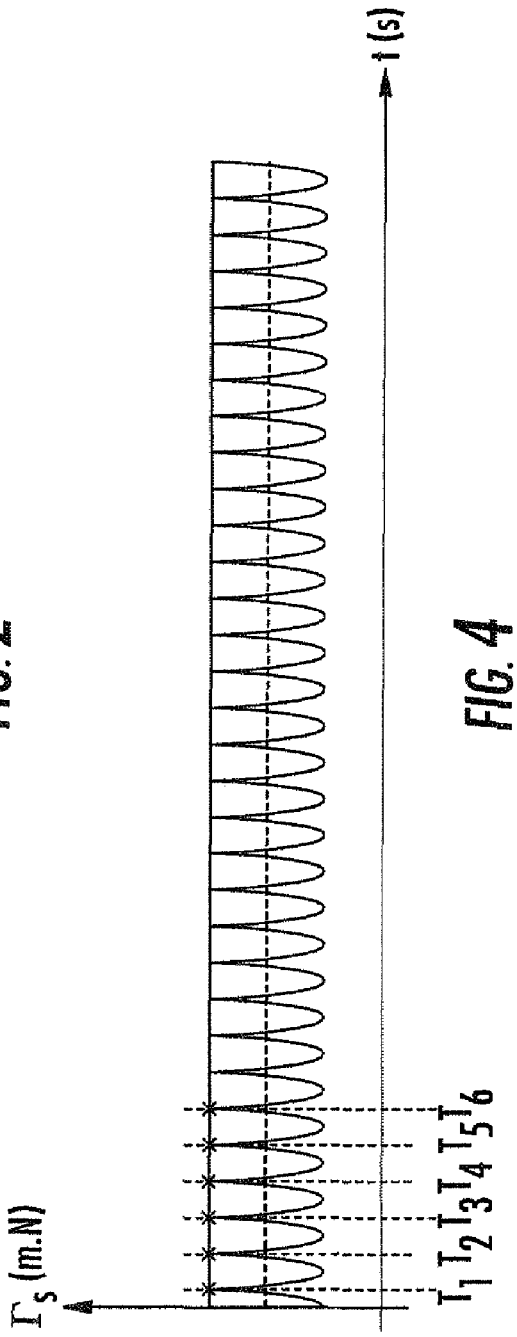
FIG. 4 is graph representing the variation of the instantaneous torque as a function of time, in the case of the regulation method in FIG. 3.

Under the control of the module 26, the inverter 8 generates a voltage and a current corresponding to the modulus $\|\vec{V}\|$ and to the angle $\beta_0$. By constructing this modulus $\|\vec{V}\|$ and the angle $\beta_0$, the instantaneous torque of the motor reaches the instantaneous torque set point corresponding to the input set point $(\hat{I}_d, \hat{I}_q)$ exactly at the next regulation time. This is what is represented on the graph in FIG. 4. The first six regulation times $T_1$ to $T_6$ have been represented on this graph. The thin horizontal line represents the instantaneous torque set point corresponding to the set point $(\hat{I}_d, \hat{I}_q)$. The bold line represents the development of the instantaneous torque $\Gamma$, as a function of time. It may be noted that by virtue of the operation 96, the instantaneous torque is equal to the instantaneous torque set point at each regulation time. It may also be noted that the average of the instantaneous torque, represented by a broken horizontal line, between two regulation times is, for example, lower on this graph than the instantaneous torque set point value corresponding to the set point $(\hat{I}_d, \hat{I}_q)$. This explains why, as in the known methods, if the input set point of the module 24 is established only from the average torque set point $\Gamma_{cm}$, the difference between the average of the instantaneous set point between two regulation times and the average torque set point since this difference is not only a function of the average torque set point.

In order to resolve this problem, the method of FIG. 2 includes a step 110 of determining the values of the current and voltage harmonics, and the step 92 includes specific calculation operations which will now be described.

During the step 110, the module 52 determines the values of the components $\Delta I_q$ and $\Delta I_d$ at each regulation time, during an operation 112, from:

the value of the angle $\beta_0$ delivered by the module 24, the value of the parameter $\epsilon(0)$ delivered by the module 28, the value of the angle $\rho_0$ measured by the sensor 56, and the value of the angular velocity $\omega$ measured by the sensor 58.

The values determined during this operation 112 are then transmitted to the modules 42 and 44 of the calculation unit 22.

Simultaneously with the operation 112, the module 54 determines the values of the components $\Delta J_q$ and $\Delta J_d$ during an operation 114. The values of $\Delta J_q$ and $\Delta J_d$ are transmitted to the module 44.

In order to make it possible to obtain, from the average torque set point $\Gamma_{cm}$, an instantaneous torque set point allowing the average torque set point $\Gamma_{cm}$ to be reached within a few regulation times, the step 92 includes the following operations:

an operation 120 of calculating the set point $\tilde{I}_q$ by the module 40, and an operation 122 of correcting this set point $\tilde{I}_q$ in order to obtain the component $\hat{I}_q$ of the instantaneous current set point making it possible to converge the average of the instantaneous torque between two regulation times toward the set point $\Gamma_{cm}$.

So as to take limitations of the instantaneous voltage $\hat{V}_M$ and instantaneous current $\hat{I}_M$ of the inverter 8 into account, during an operation 124 the module 44 establishes the value of the component $\hat{I}_d$ allowing these limits to be complied with.

If the set point $\Gamma_{cm}$ increases, for example, then the fundamental current set point $\tilde{I}_q$ and the instantaneous current set point $(\hat{I}_d, \hat{I}_q)$ will increase and, after the operations 122, 124 and 96, this leads to an increase in the modulus $\|\vec{V}\|$. For example, this increase in the modulus $\|\vec{V}\|$ causes the module 28 to select a new type of pulse width modulation corresponding to new values for the angles $\alpha_i$. The selection of a new type of pulse width modulation also leads to generation of different values for the parameters $\epsilon(0)$ and $\delta(0)$. From the new values of these parameters $\epsilon(0)$ and $\delta(0)$, the modules 52 and 54 determine the new values of the components $\Delta I_q$, $\Delta I_d$, $\Delta J_q$ and $\Delta J_d$ when next carrying out the operation 120, making it possible to correct the instantaneous current set point $(\hat{I}_q, \hat{I}_d)$, for example by increasing it, so that the average of the instantaneous torque between two regulation times is equal to the set point $\Gamma_{cm}$.

The method of FIG. 3 thus makes it possible to regulate the average torque of the motor by using an exact response control process. It therefore has a wide dynamic range. Furthermore, the exact response control process is combined with a synchronous pulse width modulation process in this case, so that certain specific harmonic orders are eliminated.

As a variant, if the computation power is sufficient, the operations 122, 124, 96 and 98 are repeated multiply at each regulation time, before the operation 100 is carried out. The multiple repetition of the operations 122, 124, 96 and 98 makes it possible to obtain a more precise value for the current set point $(\hat{I}_d, \hat{I}_q)$. Thus, if the number of iterations is large enough, the set point $(\hat{I}_d, \hat{I}_q)$ is sufficiently precise to make it possible to reach any new value of the average torque set point $\Gamma_{cm}$, which is itself in rapid variation, after just one regulation time.

The system 2 has been described here with reference to the particular case in which the exact response control operation is carried out according to the teaching of application EP-A-123 35 06. As a variant, however, another exact response control method may be used, for example a method based on so-called sliding modes.

The invention claimed is:

1. A method for regulating the average electromagnetic torque of a polyphase rotating electrical machine equipped with stator and/or rotor windings, which are supplied with a polyphase voltage and a polyphase current that are generated by an inverter, the inverter being formed by switches whose switching is controllable, this method including:
   a control step of switching the switches as a function of an instantaneous torque set point, using an exact response control process to do this so that the instantaneous torque set point is reached as soon as the next regulation time, and
   a step at each regulation time of calculating, from an average torque set point, the instantaneous torque set point to be applied so that the average of the instantaneous electromagnetic torque of the machine converges toward said average torque set point,
   which method includes a step of determining the value of the harmonics of the voltage and/or the current which are generated by the inverter, and wherein the instantaneous torque set point is also established during the calculation step as a function of this value of the harmonics, so as to produce an instantaneous torque set point suitable for limiting the difference between the average of the instantaneous electromagnetic torque, between two successive regulation times, and said average torque set point.

2. The method as claimed in claim 1, wherein the exact response control process establishes a set point for controlling the switches by pulse width modulation, and wherein the control step also includes a control operation of switching the switches between each regulation time, employing a pulse width modulation process configured as a function of said control set point established by the exact response control process.

3. The method as claimed in claim 1, wherein the pulse width modulation process is a pulse width modulation process synchronous with the frequency of the fundamental of the voltage generated by the inverter, and wherein the regulation times are spaced apart by a time interval equal to T'/2p, where p is the number of phases of the machine and T' is the period of the fundamental of the voltage generated by the inverter.

4. The method as claimed in claim 3, wherein the exact response control process is adapted so that the phase of the fundamental of the voltage generated by the inverter at the regulation times is equal to $$\frac{k\pi}{p},$$

k being an integer.

5. The method as claimed in claim 1, wherein the value of the harmonics is established, during the determining from the value of the control set point established by the exact response control process at preceding regulation time.

6. The method as claimed in claim 2, wherein:
   the pulse width modulation process successively uses a plurality of different pulse width modulations over time,
   the value of the harmonics is established from at least one calculation parameter ($\epsilon(0)$, $\delta(0)$), the various values of the or each parameter being calculated in advance and prerecorded for each different pulse width modulation liable to be used, and
   the value of the or each parameter to be used during the determining step is selected as a function of the value of the control set point established by the exact response control process at the preceding regulation time.

7. The method as claimed in claim 6, wherein a calculation parameter is defined by the following relationship:

$$\varepsilon(0) = \left(\sum_{n=2}^{\infty} \frac{V_n}{n}\right)_0$$

where:
$V_n$ is the amplitude of the voltage harmonic of order n,
n is an integer corresponding to the order of the harmonic.

8. The method as claimed in claim 7, wherein the control set point is a voltage vector defined, in an orthonormal reference frame $\alpha,\beta$ which is fixed with respect to the stator windings, by its modulus ($\|\vec{V}\|$) and an angle ($\beta_0$), and in that the value of the current harmonics is established from the following relationship:

$$\Delta I_q = -\frac{\varepsilon(0)}{L \cdot \omega} \cdot \cos(\beta_0 - \rho_0)$$

where:

L is the stator inductance of the rotating electrical machine, $\omega$ is the angular velocity of the rotor of the rotating electrical machine, $\beta_0$ is the angle of the voltage vector established at the preceding regulation time by the exact response control process, $\Delta I_q$ is the value of the current harmonics along the axis q in a rotating reference frame d,q associated with the rotor flux, the rotor flux being aligned with the axis d, and $\rho_0$ is the angle of the reference frame d,q with respect to the fixed reference frame $\alpha,\beta$ associated with the stator windings.

9. The method as claimed in claim 6, wherein a calculation parameter is defined by the following relationship:

$$\delta(0) = \left(\sum_{n=2}^{\infty} V_n\right)$$

where Vn is the amplitude of the voltage harmonic of order n.

10. The method as claimed in claim 7, wherein the inverter is supplied from at least one amplitude-limited direct current supply voltage, and wherein the instantaneous torque set point is also established during the calculation step as a function of the instantaneous value ($\hat{V}_M$) of the direct current voltage available at the regulation time, so that the instantaneous torque set point corresponds to an available direct current voltage.

11. The method as claimed in claim 10, wherein the instantaneous torque set point is established in the form of an instantaneous current set point ($\hat{I}_d$, $\hat{I}_q$) with the aid of the following relationships:

$$[\hat{I}_d - \hat{I}_{dc}]^2 + [\hat{I}_q - \hat{I}_{qc}]^2 \leq \frac{\hat{V}_M^2}{Z^2}$$

$$\hat{I}_d^2 + \hat{I}_q^2 \leq \hat{I}_M^2$$

where:

$\hat{V}_M$ is the instantaneous value of the maximum direct current voltage available for supplying the inverter, $\hat{I}_M$ is the instantaneous value of the maximum current that can be generated by the inverter 8, $\hat{I}_q$ and $\hat{I}_d$ are the components of the set point of the instantaneous current vector respectively along the axes q and d of the reference frame d,q Z is defined by the following relationship:

$Z = \sqrt{R^2 + L^2 \cdot \omega^2}$, where R is the stator resistance of the machine, L is the stator inductance of the machine and $\omega$ is the angular velocity of the rotor of the machine, $\hat{I}_{dc}$ and $\hat{I}_{qc}$ are defined by the following relationships:

$$\hat{I}_{dc} = -\frac{L \cdot \omega}{Z^2} \cdot \{R \cdot (\Delta I_q - \Delta J_q) - L \cdot \omega \cdot (\Delta I_d - \Delta J_d) + \omega \cdot \Phi_a\}$$

$$\hat{I}_{qc} = -\frac{1}{Z^2} \cdot \{R \cdot \omega \cdot \phi_a - R \cdot L \cdot \omega \cdot (\Delta I_d - \Delta J_d) - L^2 \cdot \omega^2 \cdot (\Delta I_q - \Delta J_d)\}$$

where:

$\Delta I_d$ and $\Delta I_q$ are the components of the harmonic current vector generated by the inverter, respectively along the axes d and q of the reference frame d,q, and $\Delta J_q$ and $\Delta J_d$ are components proportional to the harmonic voltage vector generated by the inverter, respectively along the axes q and d of the reference frame d,q, the components $\Delta I_d$, $\Delta J_q$ and $\Delta J_d$ being defined by the following relationships:

$$\Delta I_d = +\frac{\varepsilon(0)}{L \cdot \omega} \cdot \sin(\beta_0 - \rho_0)$$

$$\Delta J_d = \frac{\delta(0)}{L \cdot \omega} \cdot \sin(\beta_0 - \rho_0)$$

$$\Delta J_q = -\frac{\delta(0)}{L \cdot \omega} \cdot \cos(\beta_0 - \rho_0)$$

12. An information storage medium, which includes instructions, carried out by an electronic computer, for carrying out a method for regulating the average electromagnetic torque of the polyphase rotating electrical machine equipped with stator and/or rotor windings, which are supplied with a polyphase voltage and a polyphase current that are generated by an inverter, the inverter being formed by switches whose switching is controllable, this method including:

a control step of switching the switches as a function of an instantaneous torque set point, using an exact response control process to do this so that the instantaneous torque set point is reached as soon as the next regulation time, and a step at each regulation time of calculating, from an average torque set point, the instantaneous torque set point to be applied so that the average of the instantaneous electromagnetic torque of the machine converges toward said average torque set point, which method includes a step of determining the value of the harmonics of the voltage and/or the current which are generated by the inverter, and wherein the instantaneous torque set point is also established during the calculation step as a function of this value of the harmonics, so as to produce an instantaneous torque set point suitable for limiting the difference between the average of the instantaneous torque, between two successive regulation times, and said average torque set point.

13. A data structure stored in a memory (32), capable of making it possible to regulate the average electromagnetic torque of a polyphase rotating electrical machine when said data structure is used in a method for regulating the average electromagnetic torque of the polyphase rotating electrical machine equipped with stator and/or rotor windings, which are supplied with a polyphase voltage and a polyphase current that are generated by an inverter, the inverter being formed by switches whose switching is controllable, method including:

a control step of switching the switches as a function of an instantaneous torque set point, using an exact response control process to do this so that the instantaneous torque set point is reached as soon as the next regulation time, and a step at each regulation time of calculating, from an average torque set point, the instantaneous torque set point to be applied so that the average of the instantaneous electromagnetic torque of the machine converges toward said average torque set point, which method includes a step of determining the value of the harmonics of the voltage and/or the current which are generated by the inverter, and wherein the instantaneous torque set also established during the calculation step as a function of this value of the harmonics, so as to produce an instantaneous torque set point suitable for limiting the difference between the average of the instantaneous electromagnetic torque, between two success ye regulation times, and said average torque set point, which data structure associates a plurality of angles ($\alpha_i$) and the value of at least one regulation parameter ($\epsilon(0)$, $\delta(0)$) with each particular value of a control set point ($\|\vec{v}\|$) established by the exact response control process, the set of angles ($\alpha_i$) associated with a given value of said control set point defining a particular pulse width modulation synchronous with the frequency of the fundamental of the voltage generated by the inverter, and the value of said at least one regulation parameter ($\epsilon(0)$, $\delta(0)$) being a function of the value of the current and/or voltage harmonics which are generated by the inverter, when it is controlled with the aid of the pulse width modulation defined by the angles ($\alpha_i$) associated with the same value of the control set point ($\|\vec{v}\|$).

14. A system for regulating the average electromagnetic torque of a polyphase rotating electrical machine equipped with stator and/or rotor windings, which are supplied with a polyphase voltage and a polyphase current that are generated by an inverter, the inverter being formed by switches whose switching is controllable, this system including:

a control unit for the switching of the switches as a function of an instantaneous torque set point, this control unit being capable of using an exact response control process to do this so that the instantaneous torque set point is reached as soon as the next regulation time, and a unit for calculating, from an average torque set point, the instantaneous torque set point to be applied so that the average of the instantaneous electromagnetic torque of the machine converges toward said average torque set point, which system includes a unit for determining the value of the harmonics of the voltage and/or the current which are generated by the inverter, and wherein the calculation unit also calculates the instantaneous torque set point as a function of this value of the harmonics, so as to produce an instantaneous torque set point suitable for limiting the difference between the average of the instantaneous electromagnetic torque, between two successive regulation times, and said average torque set point.

* * * * *